United States Patent Office 2,700,662
Patented Jan. 25, 1955

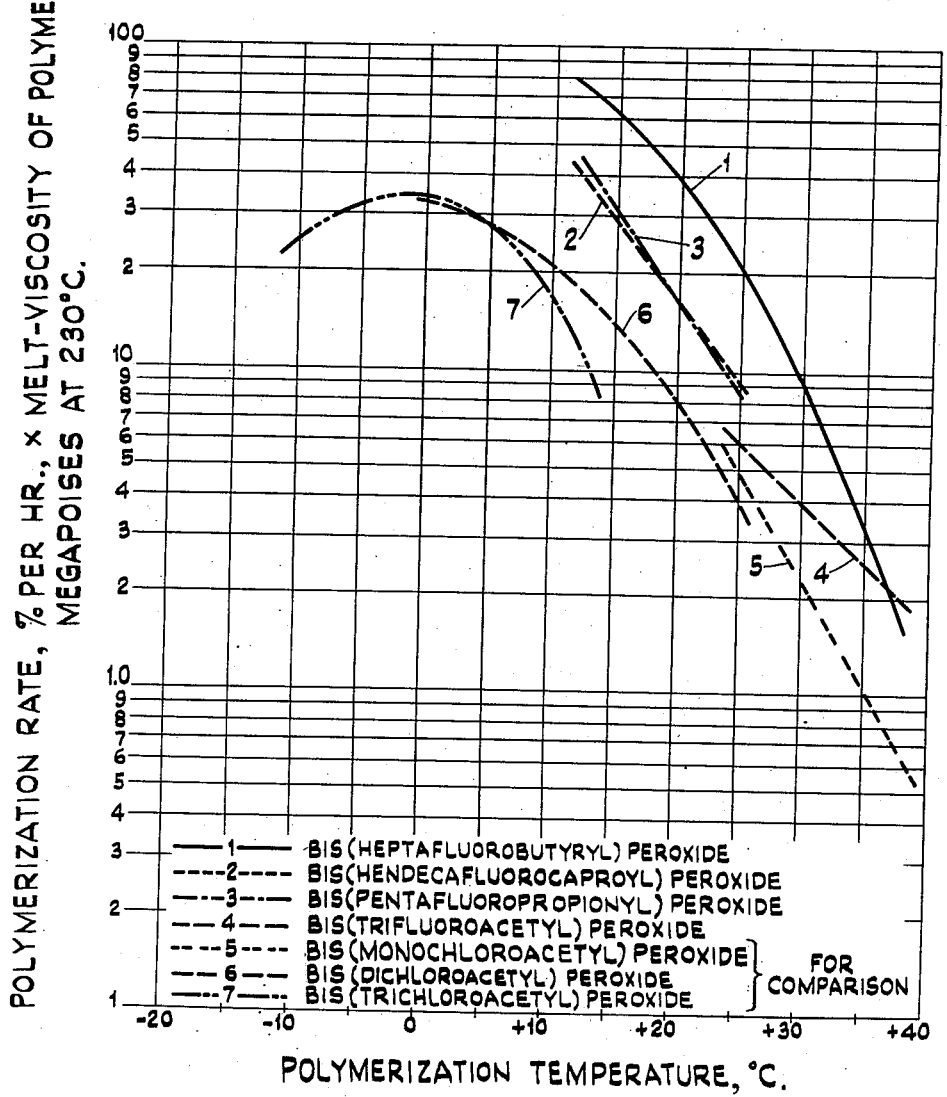

2,700,662

PROCESS FOR POLYMERIZING CHLOROTRIFLUOROETHYLENE WITH BIS-HEPTAFLUOROBUTYRYL PEROXIDE

Donald M. Young and Bruce Thompson, Charleston, W. Va., assignors to Union Carbide and Carbon Corporation, a corporation of New York Application May 17, 1951, Serial No. 226,928

1 Claim. (Cl. 260—92.1)

This invention relates to the polymerization of halogen-substituted ethylenes; and more especially it relates to a novel process for polymerizing such compounds in the presence as catalyst of small amounts of certain novel bis(perfluoroacyl) peroxides. The invention has especial utility for the polymerization of completely halogen-substituted ethylenes free from hydrogen atoms, and containing at least two different halogen atoms, including at least one fluorine atom, such as chlorotrifluoroethylene, trichlorofluoroethylene, 1,1-dichloro-2,2-difluoroethylene, and mixtures of such halogen-substituted ethylenes. However, the invention also is useful for the polymerization of other halogen-substituted ethylenes, such as vinyl chloride, vinyl fluoride, vinylidene chloride, vinylidene fluoride, mixtures of two or more of such monomers, and mixtures of halogen-substituted ethylenes with other monomeric polymerizable compounds containing an ethylenic double bond, such as vinyl acetate, and the lower alkyl esters of acrylic and alpha-methacrylic acids.

Among the more important objects of the invention are the following: to provide an improved process for making polymers of halogen-substituted ethylenes containing at least one fluorine substituent and one halogen substituent other than fluorine, and having no hydrogen atoms; to provide for the production of high molecular weight polymers and copolymers of such halogen-substituted ethylenes; to provide for the production at good polymerization rates of high molecular weight polymers of chlorotrifluoroethylene which are more resistant to thermal decomposition than those heretofore made. These and other objects will be evident from the following description of the invention.

Resinous polymers of chlorotrifluoroethylene as ordinarily prepared tend to be unstable and to discolor and undergo severe molecular weight degradation at temperatures required for the extrusion and for the injection molding of these resins. It has been discovered that the contamination of these resins with even traces of hydrocarbons and various other organic compounds containing one or more hydrogen atoms seriously degrades the resins. Moreover, the presence in the chlorotrifluoroethylene undergoing polymerization of an alkanol such as methanol or isopropanol, a dialkyl ether such as dimethyl or diethyl ether, or a halogenated ethylene having a carbon to hydrogen bond greatly lowers the polymerization rate, and seriously limits the molecular weight of the polymers produced, even when present in amounts around 0.05% of the monomer. However, completely fluorinated saturated aliphatic hydrocarbons have little or no deleterious effects upon the stability of these resins against discoloration and loss of molecular weight at high temperatures. Certain alkanes completely halogenated with fluorine and chlorine can be tolerated in the polymerization mixture in amounts up to about 10% without appreciable effect.

Heretofore, such polymers of chlorotrifluoroethylene have been made using as polymerization catalysts dialkyl peroxides such as di-tertiary-butyl peroxide, alkyl hydroperoxides such as tertiary-butyl hydroperoxide, and esters of peracids such as tertiary-butyl perbenzoate. Diacyl peroxides such as diacetyl peroxide, dibenzoyl peroxide and dicaprylyl peroxide have been tried. All of these compounds contain carbon to hydrogen bonds. In such polymerizations, even if every effort is made throughout the polymerization and recovery steps to avoid contamination of the resin, the resultant polymer still will be contaminated with residues from the decomposition of such polymerization catalysts.

This invention is based in important part upon the discovery that a novel class of bis(perfluoroacyl) peroxides, which are substantially free from chemically bound hydrogen atoms, are highly effective catalysts for the polymerization of chlorotrifluoroethylene. Moreover, the resins produced by the use of these new catalysts are more resistant to thermal degradation than are those made with the use of prior known catalysts. When using certain of the new compounds or mixtures thereof as catalysts, it is now possible to conduct the polymerization of chlorotrifluoroethylene, and mixtures thereof with another completely halogen-substituted ethylene containing both chlorine and fluorine, at temperatures as high as 12° C. to 50° C. without producing polymers having unduly low molecular weights.

Bis(heptafluorobutyryl) peroxide is an outstanding catalyst for the polymerization of chlorotrifluoroethylene. By the use of this catalyst, resins resistant to thermal degradation and having high molecular weights can be produced at a better combination of high polymerization temperature and high polymerization rate than when using other bis(perfluoroacyl) peroxides.

At present it is not possible to measure directly the molecular weight of polychlorotrifluoroethylene resins, but it has been proved that the molecular weight and melt viscosity of such a resin are related. The melt viscosities recited herein are measured at 230° C. on a parallel plate plastometer by the process described by G. J. Dienes and H. F. Klemm in the Journal of Applied Physics, vol. 17, pages 458–471 (June 1946). Herein the melt viscosity of a resin is employed as a measure of molecular weight on a relative basis, and the change in melt viscosity of a resin as a result of its exposure to elevated temperatures is taken as a measure of molecular weight degradation of the resin. In the case of polychlorotrifluoroethylene, those polymers having melt viscosities at 230° C. of less than around 0.5 megapoise are brittle and have limited utility for those applications requiring the use of the polymer in the solid state at normal room temperatures, while polymers having melt viscosities in excess of 100 megapoises are more difficult to fabricate into useful articles. However, low molecular weight liquid polymers are useful in lubricating compositions as replacements for hydrocarbon lubricating oils, and are highly resistant to oxidation.

The polymerization of the chlorotrifluoroethylene or other halogen-substituted ethylenes preferably is conducted at temperatures between 0° C. and around 50° C., but higher and lower temperatures can be used less effectively. Autogenous superatmospheric pressures and higher pressures are useful. In such polymerizations between around 0.01% and 0.2% or more of the catalyst commonly is used, being added to the monomer in the form of a dilute solution of the peroxide, containing around 1 to 10 grams of the peroxide per 100 cc. of solvent, in a solvent substantially without effect on the polymerization, e. g., a saturated organic solvent completely halogenated with fluorine or with fluorine and chlorine, preferably a completely halogenated alkane containing one or more fluorine atoms attached to each carbon atom, with or without one or more atoms of chlorine. Examples are trichlorofluoromethane, dichlorodifluoromethane, 1,1,2-trichloro-1,2,2-trifluoroethane, perfluorobutane, perfluoropentane and perfluorooctane. Perfluorotetrahydrofuran can be used. The polymerization can be effected in an atmosphere of an inert gas such as nitrogen, although this is not necessary.

The polymerization data in Table I offer a comparison of the relative stability against degradation by heat of polychlorotrifluoroethylene resins made using certain of the novel catalysts of this invention and those resins made using certain other types of catalysts, e. g., diacetyl peroxide and bis(trichloroacetyl) peroxide. Melt viscosity measurements were made on various samples of the resins before and after subjecting them to a temperature of 300° C. for one hour. The percentage of the initial melt viscosity retained by the samples after the exposure at 300° C. is a measure of the thermal stability of the resin.

In making the resins there were introduced into a glass tube 50 grams of purified chlorotrifluoroethylene and the indicated per cent of the catalyst, based upon the weight of the monomer. The monomer used in preparing the resins had been purified by careful rectification in an efficient fractionating column. In the runs using the bis(perfluoroacyl) peroxides and bis(trichloroacetyl) peroxide, the catalyst was introduced as a solution containing approximately 2.5 grams of the peroxide per 100 cc. of a 50:50 by volume mixture of trichlorofluoromethane and 1,1,2-trichloro-1,2,2-trifluoroethane. In the case of the run using diacetyl peroxide, the latter was used in the form of a 20% solution in dimethyl phthalate. The tube then was flushed with nitrogen, sealed, and immersed in a water bath at the indicated polymerization temperature for a sufficient time to give about a 10% conversion to polymer. The tubes then were removed, chilled in Dry Ice and opened. After most of the residual monomer had weathered off, the polymer was dried at 60° C. overnight, and then at 200° C. for five hours. After determining the initial melt viscosity of the resin, it was heated to 300° C. for one hour with dry heat, and then the melt viscosity was again determined. It will be noted that the resins made with the catalysts of this invention were much more resistant to the action of the heat than were the other resins.

Of importance in the evaluation of a polymerization catalyst are the rate of polymerization obtainable at a given temperature, and the molecular weight of the resultant polymer. In general, for a given catalyst, the greater the catalyst concentration, the greater is the rate of polymerization, and the lower is the molecular weight of the polymer formed; while higher polymerization temperatures yield higher polymerization rates and decreased molecular weight polymers. Practical limitations, however, impose rather rigid restraints upon the degree to which catalyst concentrations and polymerization temperatures can be adjusted in seeking favorable polymerization rates for the production of resins having a range of molecular weights satisfactorily high, e. g., those corresponding to melt viscosities of around 0.5 megapoise or more.

Table II presents data illustrating the effects of varying the polymerization temperatures upon the rate of polymerization of chlorotrifluoroethylene and upon the melt viscosity at 230° C. of the resultant polymer. In each run, 0.025% by weight of the catalyst, based upon the monomer, was used. The polymerizations were limited to low conversions of monomer in order to minimize variations in molecular weight arising from differences in the degree of conversion. The polymerizations, the data of which appear in Table II, were conducted under the same general conditions used in the polymerizations upon which Table I is based; and the polymer was recovered in the same manner.

The accompanying drawing presents in graphic form portions of the data of Table II. In the drawing the product of the polymerization rate, in terms of weight per cent of monomer polymerized per hour, and the melt viscosities at 230° C. of the polymer formed, in terms of megapoises, has been plotted against the polymerization temperature for each run. It is apparent from the drawing that a more favorable polymerization rate and molecular weight relationship for a given polymerization temperature is securable with the bis(perfluoroacyl) peroxides of this invention than with the chloroacetyl peroxides examined. This is especially true of bis(heptafluorobutyryl) peroxide; although bis(trifluoroacetyl) peroxide offers advantages on the basis of its lower cost of production.

TABLE I

| Catalyst | Catalyst Concentration, Percent | Polymerization Temperature, °C. | Melt Viscosity, Megapoises at 230° C. | | Melt Viscosity, Retained, Percent |
|---|---|---|---|---|---|
| | | | Initial | After 1 Hr. at 300° C. | |
| Bis (heptafluorobutyryl) peroxide | 0.025 | 30 | 7.8 | 5.3 | 68 |
| Bis (trifluoro-acetyl) peroxide | 0.025 | 40 | 5.9 | 4.0 | 68 |
| Bis (trichloro-acetyl) peroxide* | 0.06 | 0 | 6.6 | 2.2 | 33 |
| Diacetyl peroxide* | 0.10 | 25 | 8.2 | 1.0 | 12 |

NOTE.—* For comparison.

TABLE II

| Catalyst | Polymerization | | | Final Yield, Percent | Melt Viscosity, Megapoises at 230° C. | Polymerization Rate × Melt Viscosity |
|---|---|---|---|---|---|---|
| | Temperature, °C. | Time, Hours | Rate, Percent/Hr. | | | |
| Bis(trifluoroacetyl) peroxide | 25 | 49 | 0.15 | 7.5 | 39 | 6 |
| Do | 37.5 | 66 | 0.11 | 7.4 | 15 | 2 |
| Bis(pentafluoropropionyl) peroxide | 12.5 | 50 | 0.29 | 14.6 | 150 | 43 |
| Do | 25 | 16 | 0.56 | 9.0 | 15 | 8 |
| Bis(heptafluorobutyryl) peroxide | 12.5 | 40 | 0.35 | 13.9 | 220 | 77 |
| Do | 25 | 16 | 0.81 | 13.0 | 26 | 21 |
| Do | 35 | 18.5 | 0.49 | 9.0 | 6 | 3 |
| Bis(hendecafluorocaproyl) peroxide | 12.5 | 25 | 0.50 | 12.4 | 82 | 41 |
| Do | 25 | 16 | 0.66 | 10.6 | 14 | 9 |
| Bis(monochloroacetyl) peroxide* | 25 | 110 | 0.09 | 9.9 | 55 | 5 |
| Do | 37.5 | 44 | 0.27 | 11.8 | 3 | 0.8 |
| Bis(dichloroacetyl) peroxide* | 0 | 33.5 | 0.22 | 7.4 | 150 | 33 |
| Do | 12.5 | 16 | 0.68 | 10.9 | 27 | 18 |
| Do | 25 | 8 | 0.89 | 7.1 | 4 | 4 |
| Bis(trichloroacetyl) peroxide* | −10 | 48 | 0.27 | 13.1 | 92 | 25 |
| Do | 0 | 26 | 0.48 | 12.4 | 72 | 35 |
| Do | 12.5 | 17.5 | 0.37 | 6.5 | 30 | 11 |

NOTE.—* For comparison.

The following two examples illustrate the use of the bis(perfluoroacyl) peroxides as catalysts for the copolymerization of chlorotrifluoroethylene and other completely halogen-substituted ethylenes containing chlorine and fluorine.

*Copolymerization of chlorotrifluoroethylene and trichlorofluoroethylene*

A chilled pressure tight container was charged with 45 grams of chlorotrifluoroethylene, 5 grams of trichlorofluoroethylene, and 0.05 gram of bis(heptafluorobutyryl) peroxide, the latter being introduced in the form of a solution containing 2.5 grams of the peroxide per 100 cc. of a mixture of equal volumes of 1,1,2-trichloro-1,2,2-trifluoroethane and trichlorofluoromethane. The container was flushed with nitrogen, sealed, and held at 25° C. in a water bath for 17 hours. The resultant resinous copolymer contained around 65% of the chlorotrifluoroethylene in the polymer.

*Copolymerization of chlorotrifluoroethylene and 1,1-dichloro-2,2-difluoroethylene*

A chilled pressure tight container was charged with 45 grams of chlorotrifluoroethylene, 5 grams of 1,1-dichloro-2,2-difluoroethylene, and 0.05 gram of bis(heptafluorobutyryl) peroxide, the latter being added as a solution of the kind described in the preceding example. The container and contents were flushed with nitrogen, sealed and held at 25° C. for 17 hours. The resultant resinous copolymer contained 68% of the chlorotrifluoroethylene.

The following examples illustrate the effectiveness of the bis(perfluoroacyl) peroxides as catalysts for the polymerization of halogen-substituted ethylenes which contain hydrogen atoms.

*Production of polyvinyl chloride*

A chilled glass container was charged with 25 grams of liquid vinyl chloride and 0.025 gram of bis(heptafluorobutyryl) peroxide (the latter being added as a solution containing 2.5 grams of the peroxide per 100 cc. of a mixture of equal volumes of 1,1,2-trichloro-1,2,2-trifluoroethane and trichlorofluoromethane). The container was flushed with nitrogen, sealed, and placed in a water bath held at 25° C. After two hours the container was chilled in Dry Ice, opened, and the polymer was dried overnight at 60° C. and weighed. A conversion of 20.8% of the monomer to a polyvinyl chloride having a reduced viscosity in cyclohexanone of 1.8 was secured, at an average conversion rate of 10.4% of the monomer per hour.

*Production of polyvinylidene chloride*

Following the general procedure described herein for the production of polyvinyl chloride, a mixture of 40 grams of vinylidene chloride and 0.040 gram of bis(heptafluorobutyryl) peroxide gave, after 1.75 hours of polymerization at 25° C., an 8.0% conversion of the monomer to polyvinylidene chloride, at an average conversion rate of 4.6% of the monomer per hour.

The bis(perfluoroacyl) peroxides used as polymerization catalysts in the process of the invention have structures corresponding to the formula:

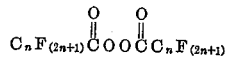

wherein $n$ designates an integer of from 1 to 10 and $C_nF_{(2n+1)}$ can be a primary, secondary or tertiary fluorine-substituted alkyl group. They can be made by vigorously agitating an aqueous solution of an alkali metal peroxide at temperatures within the range between around —15° C. and 25° C. with an acyl halide of a perfluoro fatty acid, such as trifluoroacetyl chloride, dissolved in a mixture of equal volumes of 1,1,2-trichloro-1,2,2-trifluoroethane and trichlorofluoromethane, the alkali metal peroxide and perfluoroacyl halide being in the molar ratio of 1 to around 1.5 or more, and the said solution of the halide being fed rapidly to the aqueous solution of the alkali metal peroxide. The reaction mixture is allowed to stratify, and the solvent layer which contains the bis(perfluoroacyl) peroxide, is separated and stored at low temperatures, preferably around —15° C. or lower. The solution can be used directly without purification in the polymerization, diluted with the said solvent if necessary to provide a solution having from 1% to 10% by weight of the solute.

By the practice of this invention, it is possible to polymerize completely halogen-substituted ethylenes such as chlorotrifluoroethylene, and to secure thereby resins having average molecular weights sufficiently high to adapt the resins for commercial uses, and which resins are more resistant to thermal degradation than resins made using catalysts heretofore known, and to effect this result using higher polymerization temperatures and polymerization rates than has been possible heretofore.

The invention is susceptible of modification within the scope of the appended claim.

We claim:

Process for making polymers of chlorotrifluoroethylene, which comprises contacting chlorotrifluoroethylene at a temperature within the range from around 0° C. to around 50° C. with a small amount of bis(heptafluorobutyryl) peroxide.

References Cited in the file of this patent

UNITED STATES PATENTS

| | | |
|---|---|---|
| 2,531,134 | Kropa | Nov. 21, 1950 |
| 2,559,630 | Bullitt | July 10, 1951 |
| 2,564,024 | Miller | Aug. 14, 1951 |
| 2,586,550 | Miller | Feb. 19, 1952 |